US008828346B2

(12) United States Patent
Johnson

(10) Patent No.: US 8,828,346 B2
(45) Date of Patent: Sep. 9, 2014

(54) METHOD OF MAKING FLUOROSULFONYLAMINE

(75) Inventor: Martin R. Johnson, Oakland, CA (US)

(73) Assignee: Trinapco, Inc., Oakland, CA (US)

( * ) Notice: Subject to any disclaimer, the term of this patent is extended or adjusted under 35 U.S.C. 154(b) by 47 days.

(21) Appl. No.: 13/415,461

(22) Filed: Mar. 8, 2012

(65) Prior Publication Data

US 2012/0230906 A1 Sep. 13, 2012

Related U.S. Application Data

(60) Provisional application No. 61/464,771, filed on Mar. 8, 2011.

(51) Int. Cl.
C01B 21/093 (2006.01)
C01B 17/46 (2006.01)

(52) U.S. Cl.
CPC .................................. C01B 21/093 (2013.01)
USPC ......................................... 423/386; 423/467

(58) Field of Classification Search
USPC .......................................................... 423/386
See application file for complete search history.

(56) References Cited

U.S. PATENT DOCUMENTS

| | | | |
|---|---|---|---|
| 2,130,038 A | 9/1938 | Schrader et al. | |
| 3,379,509 A | 4/1968 | Appel | |
| 3,411,889 A | 11/1968 | Kopec | |
| 3,418,088 A | 12/1968 | Shozda | |
| 5,072,040 A | 12/1991 | Armand | |
| 5,256,821 A | 10/1993 | Armand | |
| 5,723,664 A | 3/1998 | Sakaguchi et al. | |
| 5,874,616 A | 2/1999 | Howells et al. | |
| 6,252,111 B1 | 6/2001 | Sakai et al. | |
| 6,319,428 B1 | 11/2001 | Michot et al. | |
| 6,365,301 B1 | 4/2002 | Michot et al. | |
| 6,452,048 B2 | 9/2002 | Yonezawa et al. | |
| 6,682,855 B2 | 1/2004 | Michot et al. | |
| 8,134,027 B2 | 3/2012 | Okumura et al. | |
| 2004/0097757 A1 | 5/2004 | Cernik et al. | |
| 2007/0043231 A1* | 2/2007 | Hammami et al. | 556/412 |
| 2011/0034716 A1 | 2/2011 | Okumura et al. | |
| 2011/0034732 A1 | 2/2011 | Ishii et al. | |
| 2012/0009113 A1 | 1/2012 | Honda et al. | |
| 2012/0014859 A1 | 1/2012 | Honda et al. | |
| 2012/0020867 A1* | 1/2012 | Morinaka et al. | 423/386 |
| 2012/0070358 A1 | 3/2012 | Morinaka et al. | |

FOREIGN PATENT DOCUMENTS

| | | | |
|---|---|---|---|
| JP | 2010280586 A | * | 12/2010 |
| JP | 2011144086 A3 | | 7/2011 |
| WO | 2010140580 A1 | | 12/2010 |
| WO | 2011149095 A1 | | 12/2011 |
| WO | 2012020513 A1 | | 2/2012 |

OTHER PUBLICATIONS

Ruff "Sulfur Oxyfluoride Derivatives.II" Inorganic Chemistry [Online] 1965, 4(4), pp. 567-570.
Tsuzuki et al. "Origin of the Low-Viscosity of [emim][FSO2)2N] Ionic Liquid and Its Lithium Salt Mixture; Experimental and Theoretical Study of Self-Diffusion Coefficients, Coductivities, and Intermolecular Interactions" Journal of Physical Chemistry B [Online] 2010,114, pp. 16329-16336.
R. Appel et al., Uber die Umsetzung von Disulfurylflorid, S2O5F2, mit Ammoniak und Diathylamin. Zeitschriftfur anorganische und allgemeine chemie 1961, vol. 310, No. 1-2, pp. 9093; p. 91-93.
PCT Search Report and Written Opinion in Corresponding PCT/US2012/028292, Jun. 15, 2012.
Emeleus, H.J. and J.F. Wood, 442. The preparation and reactions of carbonyl and sulphuryl fluorides and chlorofluorides. Journal of the Chemical Society (Resumed), 1948: p. 2183-2188. DOI: 10.1039/JR9480002183.
Appel, R. and G. Eisenhauer, Uber die Umsetzung von Disulforylfluorid, S2O5F2, mit Ammoniak und Diäthylamin. Zeitschrift für anorganische und allgemeine Chemie, 1961. 310(1-2): p. 90-93. DOI: 10.1002/zaac.19613100112.
Appel, R. and H. Rittersbacher, Über die Reaktion von Sulfuryl-diisocyanat mit Halogeno-schwefelsäuren. Ein einfaches Verfahren zur Herstellung von Fluorsulfonylisocyanat und Imido-bisschwefelsäurefluorid. Chemische Berichte, 1964. 97(3): p. 849-851. DOI: 10.1002/cber.19640970330.
Ruff, J.K., et al., Imidodisulfuryl Fluoride Ion. Inorganic Chemistry, 1965. 4(10): p. 1446-1449. DOI: 10.1021/ic50032a019.
Ruff, J.K., et al., Imidodisulfuryl Floride, Cesium Imidodisulfuryl Fluoride, and Fluoroimidodisulfuryl Fluoride: [<I>Imidobis(Sulfuryl Fluoride), Cesium Imidobis(Sulfuryl Fluoride), and Fluoroirnidobis(Sulfuryl Fluoride</I>)], in Inorganic Syntheses, L.J. William, Editor. 1968. p. 138-143.
Vij, A., et al., Some fluorine-containing nitrogen acids and their derivatives. Coordination Chemistry Reviews, 1997. 158: p. 413-432. DOI: 10.1016/s0010-8545(97)90069-2.
Krumm, B., et al., Synthesis of Poly- and the First Perfluoroalkyl-N(SO2F)2 Derivatives: Improved Methods for the Preparation of XN(SO2F)2 (X=H, Cl) and Single-Crystal Diffraction Studies of HN(SO2Cl)2, HN(SO2F)2, and CF3CH2N(SO2F)2†. Inorganic Chemistry, 1998. 37(24): p. 6295-6303. DOI: 10.1021/ic9800031.
Beran, M. and J. Prihoda, A New Method of the Preparation of Imido-bis(sulfuric acid) Dihalogenide, (F, Cl), and the Potassium Salt of Imido-bis(sulfuric acid) Difluoride. Zeitschrift für anorganische und allgemeine Chemie, 2005. 631(1): p. 55-59. DOI: 10.1002/zaac.200400325.
Beran, M., et al., A new route to the syntheses of alkali metal bis(fluorosulfuryl)imides: Crystal structure of LiN(SO2F)2. Polyhedron, 2006. 25(6): p. 1292-1298. DOI: 10.1016/j.poly.2005.09.017.
Huang, J. and A.F. Hollenkamp, Thermal Behavior of Ionic Liquids Containing the FSI Anion and the Li+Cation. The Journal of Physical Chemistry C, 2010. 114(49): p. 21840-21847. DOI: 10.1021/jp107740p.

(Continued)

Primary Examiner — Stanley Silverman
Assistant Examiner — Justin Bova
(74) Attorney, Agent, or Firm — Duane Morris LLP

(57) ABSTRACT

The present invention is directed to methods comprising adding $NH_3$ to a $SO_2F_2$ solution to directly form a $FSO_2NH_2$ and/or a salt of $[FSO_2NH]^-$, optionally quenching any unreacted $NH_3$ present in the resulting mixture, and isolating the product from the resulting mixture.

15 Claims, No Drawings

(56) References Cited

OTHER PUBLICATIONS

Kim, G.-T., et al., (Invited) Long-Term Cyclability of Lithium Metal Electrodes in Ionic Liquid-Based Electrolytes at Room Temperature. ECS Transactions, 2010. 25(36): p. 127-138. DOI: 10.1149/1.3393847.

Kubota, K., T. Nohira, and R. Hagiwara, Thermal Properties of Alkali Bis(fluorosulfonyl)amides and Their Binary Mixtures. Journal of Chemical & Engineering Data, 2010. 55(9): p. 3142-3146. DOI: 10.1021/je9010932.

Lewandowski, A.P., et al., Cycling and rate performance of Li-LiFePO4 cells in mixed FSI-TFSI room temperature ionic liquids. Journal of Power Sources, 2010. 195(7): p. 2029-2035. DOI: 10.1016/j.jpowsour.2009.10.059.

Han, H.-B., et al., Lithium bis(fluorosulfonyl)imide (LiFSI) as conducting salt for nonaqueous liquid electrolytes for lithium-ion batteries: Physicochemical and electrochemical properties. Journal of Power Sources, 2011. 196(7): p. 3623-3632. DOI: 10.1016/j.jpowsour.2010.12.040.

Lifei, L., et al., Transport and Electrochemical Properties and Spectral Features of Non-Aqueous Electrolytes Containing LiFSI in Linear Carbonate Solvents. Journal of the Electrochemical Society, 2011. 158(2): p. A74-A82. DOI: 10.1149/1.3514705.

Marom, R., et al., A review of advanced and practical lithium battery materials. Journal of Materials Chemistry, 2011. 21(27): p. 9938-9954. DOI: 10.1039/c0jm04225k.

Nádherná, M., et al., Lithium bis(fluorosulfonyl)imide-PYR14TFSI ionic liquid electrolyte compatible with graphite. Journal of Power Sources, 2011. 196(18): p. 7700-7706. DOI: 10.1016/j.jpowsour.2011.04.033.

Appel, R. and G. Eisenhauer, Die Synthese des Imidobisschwefelsaurefluorids, HN(SO2F)2. Chemische Berichte, 1962. 95(1): p. 246-248. DOI: 10.1002/cber.19620950139.

* cited by examiner

METHOD OF MAKING FLUOROSULFONYLAMINE

CROSS-REFERENCE TO RELATED APPLICATIONS

This application claims the benefit of the filing date of U.S. Provisional Appl. No. 61/464,771, filed Mar. 8, 2011, which is incorporated by reference herein in its entirety.

BACKGROUND OF THE INVENTION

1. Field of the Invention

The present invention is directed to methods of synthesizing fluorosulfonylamide, $FSO_2NH_2$, and salts of the fluorosulfonylamide anion, $^-[FSO_2NH]^-$.

2. Background

It is known that slow addition of $SO_2F_2$ to $NH_3$ (or vice versa) produces $SO_2(NH_2)_2$ (sulfamide) and oligomers thereof. See, e.g., U.S. Pat. No. 3,411,889 ("Kopec") and U.S. Patent Application Publication No. 2012/0020867 A1 ("Morinaka"). For example, in Comparative Example 1, Morinaka shows that $SO_2F_2$ added to a 3.2 molar excess of $NH_3$ in acetonitrile at 5° C., followed by stirring at room temperature for 48 hours, filtration, and distillation of the solvent provided $SO_2(NH_2)_2$ as a white powder. Analysis of the product showed that $FSO_2NH_2$ was produced as a minor (3%) impurity. In Comparative Example 2, Morinaka shows that slow addition of a 3.5 molar excess of $NH_3$ to a solution of $SO_2Cl_2$ in acetonitrile provided $SO_2(NH_2)_2$. Likewise, Kopec discloses that addition of $SO_2F_2$ to $NH_3$ at −65° C. to −40° C. produces sulfamide ($SO_2(NH_2)_2$) and oligomers thereof.

It has also been shown that $FSO_2NH_2$ is resistant to nucleophilic attack by ammonia at temperatures as high as −30° C. See R. Appel et al., "Uber die Umsetzung von Disulfurylfluorid, $S_2O_5F_2$, mit Ammoniak und Diäthylamin," *Zeitschrift für anorganische und allgemeine Chemie* 310 (1-2):90-93 (1961).

Conversely, a method of slowly adding $NH_3$ to a stirred solution of $SO_2F_2$ to provide $FSO_2NH_2$ as the primary product has not been shown in the prior art.

BRIEF SUMMARY OF THE INVENTION

I have found that the addition of $NH_3$ to a solution of $SO_2F_2$ in a suitable solvent initially reacts to produce $FSO_2NH_2$ and HF:

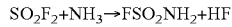

$$SO_2F_2 + NH_3 \rightarrow FSO_2NH_2 + HF$$

Gaseous $NH_3$ can be infused into the head space of a reactor containing $SO_2F_2$ in solution and/or slowly added as a solution of $NH_3$ in a solvent. When the reaction is performed in a solvent at temperatures of −30° C. or less, $NH_3$ does not readily attack the $FSO_2NH_2$ product, but instead forms a salt, per the following reaction:

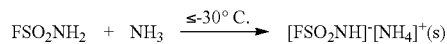

$$FSO_2NH_2 + NH_3 \xrightarrow{\leq -30°C.} [FSO_2NH]^-[NH_4]^+(s)$$

Preferably, the complete consumption of $SO_2F_2$ is the endpoint of the reaction, which can be determined by a decrease in reactor pressure to a value approaching the vapor pressure of the solvent system. Additionally, the reaction can be halted at any time and the unreacted $SO_2F_2$ vented and recovered, if desired. Also, air or an inert gas can be introduced to the vessel after the addition of one or more reagents is complete, in order to maintain the reactor pressure close to atmospheric. The $[FSO_2NH]^-[NH_4]^+$ salt does not appear to be very stable at room temperature, but can be treated with acid in situ at lower temperatures to give the product $FSO_2NH_2$. Generally, this sequence of reactions can be performed without the addition of an organic base. Optionally, an organic base more basic than ammonia (such as trimethylamine, triethylamine, and the like) may be introduced, and the complex $FSO_2NH^- BH^+$ preferentially produced. This can enable ammonia to be used only as a reactant and not as a base, and can thereby help to inhibit the formation of byproduct sulfamide. Furthermore, as Morinaka has described, formation of the bis adduct $[(FSO_2)_2N]^-[B]^+$ is very slow at temperatures below about −10° C.

In embodiments in which excess $NH_3$ is present in the solution after reaction of the $SO_2F_2$ starting material, the excess $NH_3$ can be quenched by addition of a sufficiently strong acid, followed by warming of the reactor, filtration, and distillation, to provide pure $FSO_2NH_2$.

DETAILED DESCRIPTION OF THE INVENTION

The present invention is directed to methods for preparing $FSO_2NH_2$ and $[FSO_2NH]^-$ without the use of fluorosulfonic acid or chloride metathesis reagents such as metal fluorides.

The present invention is directed to a method comprising adding $NH_3$ to a $SO_2F_2$ solution to form a product, optionally quenching any unreacted $NH_3$ present in the resulting mixture, and isolating the product from the resulting mixture.

As used herein, a "product" within the scope of the present invention includes, but is not limited to, $FSO_2NH_2$, $[FSO_2NH]^-$, and salts thereof.

The addition of $NH_3$ to a solution of $SO_2F_2$ reacts instantly to initially produce fluorosulfonylamide ($FSO_2NH_2$) and HF. Typically, the two reactants, $SO_2F_2$ and $NH_3$, are introduced as gases into a stirred reactor containing a solvent. In a preferred embodiment, $SO_2F_2$ is first added to the reactor in its entirety followed by the slow introduction of $NH_3$. $SO_2F_2$ can be added in a single step at the beginning of the reaction, or added in portions (using, e.g., a gated valve). In some embodiments, $SO_2F_2$ is added in a single step when the starting reactor temperature is ≤−30 C. Generally, $SO_2F_2$ pressure during addition to the reactor can range from 100 psi to 300 psi, more preferably 120 to 250 psi. $NH_3$ is typically added at a pressure of 50 psi to 200 psi, more preferably 70 psi to 120 psi. The gases can be added from any pressurized source, e.g., a cylinder, lecture bottle, and the like. Both $SO_2F_2$ and $NH_3$ have large Joule-Thompson coefficients, and thus the $SO_2F_2$ and/or $NH_3$ source can be heated to ensure at least a baseline pressure and/or substantially constant pressure is maintained during the adding.

Precise control of $SO_2F_2$ and/or $NH_3$ introduction can be maintained using, e.g., mass flow controllers, caliper gauges, and the like. In some embodiments, the rate of $NH_3$ addition (and/or $SO_2F_2$ addition) is controlled by internal reactor pressure, reactor temperature, or other variable conditions.

$SO_2F_2$ is highly toxic and completely odorless and colorless. Thus, significant precaution must be used when handling this substance. All reactions should be conducted in areas having sufficient ventilation. On the lab scale, this means all reactions must be conducted inside a fume hood, as well as post-reaction manipulations of the products. On the industrial scale, proper ventilation should be designed and proper safety measures followed.

The reaction of $NH_3$ with a solution of $SO_2F_2$ is highly exothermic and can be extremely rapid, and the rate of $NH_3$ addition should be carefully controlled. In preferred embodiments, the $NH_3$ is slowly added over a course of at least 30 minutes, 1 hour or longer, or 2 hours or longer to a vigorously stirred $SO_2F_2$ solution. The rate of addition is typically regulated by the rise in temperature above a starting temperature. In some embodiments, the rise in temperature from the starting static temperature is maintained at ±5° C. or less, and more preferably ±2° C. or less during the addition of $NH_3$. Effective cooling of the reactor is required.

Any solvent capable of dissolving $SO_2F_2$ can be used for the reaction. Exemplary solvents include tetrahydrofuran, ethyl acetate, ethyl ether, iso-propyl ether, 1,2-dimethoxyethane, acetonitrile, propionitrile, butyronitrile, dichloromethane, N,N-dimethylformamide, N,N-dimethylacetamide, N-methylpyrrollidinone, and the like, and combinations thereof. In embodiments in which an acid is used to "quench" the reaction, the solvent should also be chemically inert to the acid under the conditions present in the reactor during quenching.

The molar ratio of $NH_3$ to $SO_2F_2$ can be varied from about 1:1 to about 4:1. In some embodiments the molar ratio of $NH_3$ to $SO_2F_2$ is about 1:1 to about 3:1, or about 3:1 to about 4:1. Generally, three mole equivalents of $NH_3$ are sufficient to completely consume the $SO_2F_2$ present in the reactor. A mole ratio of less than 3:1 can be utilized to achieve improved $SO_2F_2$ conversion, or to eliminate the need for acidification, and any $SO_2F_2$ remaining after the reaction can be recovered and reused. Mole ratios greater than 3:1 ($NH_3/SO_2F_2$) are generally not necessary, but can be utilized within the scope of the present invention. In some embodiments, a preferred molar ratio of $NH_3$ to $SO_2F_2$ is about 3:1. In some embodiments, a preferred molar ratio of $NH_3$ to $SO_2F_2$ is about 1:1.

The starting concentration of $SO_2F_2$ can be varied. Preferred concentrations of $SO_2F_2$ in solvent (expressed as molality, i.e., moles $SO_2F_2$ per kilogram of solvent) range from 0.1 to 3 molal, or 0.5 to 2 molal. In THF solvent at −70° C., $SO_2F_2$ concentrations greater than 2 molal can result in erratic pressure readings and reduced yield. Thus, while concentrations greater than 2 molal can nonetheless be employed at a starting temperature −70° C., preferred concentrations of $SO_2F_2$ for reactions performed at a starting temperature of −70° C. are 0.5 to 2 molal.

Dissolution of $SO_2F_2$ can be measured by comparison of the static vapor pressure in the reactor (of the $SO_2F_2$/solvent blend) with the static vapor pressure of pure $SO_2F_2$ under the same conditions.

The reactor pressure during reaction can range from well above atmospheric to the static vapor pressure of the reactor contents, obtained by evacuation of the reactor (containing solvent) at suitably low temperature. The preferred vapor pressure for the reaction is that of the solvent and reactants alone. Vapor pressures were observed as low as 3 torr to as high as four atmospheres above ambient pressure under a variety of reaction conditions.

Any $NH_3$ remaining in the reaction mixture after addition should be quenched. Quenching is typically performed using a suitable acid. The main requirement for a quench acid is that it is a stronger acid than $FSO_2NH_2$—i.e., the $pK_a$ of the quench acid is less than the $pK_a$ of $FSO_2NH_2$. In some embodiments, the quench acid is capable of forming an insoluble ammonium salt. As noted herein, it is preferable that the solvent is inert to the quench acid under the quenching conditions. Exemplary suitable acids include HCl, HF, HBr, acetic acid, $H_3PO_4$, $H_2SO_4$, $HSO_3CH_3$, $HSO_3CF_3$, $CF_3COOH$. In some embodiments, $H_2SO_4$ dissolved in tetrahydrofuran is preferred.

For a reaction of $NH_3$ with $SO_2F_2$ in a 3:1 mole ratio, a ratio of quench acid to $NH_3$ can range from 0.25 to 1.5 normal equivalents, more preferably from 0.5 to 1.0, most preferably 0.67 (⅔) normal equivalents. While within the scope of the present invention, ratios of quench acid to $NH_3$ greater than 0.67 (⅔) can produce excess HF gas. While also within the scope of the present invention, ratios of quench acid to $NH_3$ less than 0.67 (⅔) can result in reduced yield of $FSO_2NH_2$. Generally, a complete reaction between $NH_3$ and $FSO_2NH_2$ can be assumed. Thus, the amount of $NH_3$ required to completely react with the $FSO_2NH_2$ can be subtracted from the total amount of $NH_3$ added, and an amount of acid sufficient to neutralize the remainder can be utilized.

The products formed in the resulting mixture can depend on the solvent, the partial pressure of free $NH_3$ at the gas-liquid interface, the concentration of dissolved $SO_2F_2$, and the temperature.

Generally, maintaining a temperature of −30° C. or less during the addition provides conditions in which $NH_3$ does not readily attack $FSO_2NH_2$ but instead acts as a base to form the $[NH4]^+[FSO_2NH]^−$ salt. Thus, in some embodiments, the present invention is directed to a method comprising adding $NH_3$ to a $SO_2F_2$ solution to form a product, wherein $SO_2F_2$ solution is maintained at a temperature of −30° C. or less during the addition, optionally quenching any unreacted $NH_3$ present in the resulting mixture, and isolating the product from the resulting mixture.

For example, at temperatures below −30° C., and in an aprotic solvent such as tetrahydrofuran, the initially formed $FSO_2NH_2$ forms $[NH4]^+[FSO_2NH]^−$. This salt complex is insoluble and precipitates from solution along with the $[NH_4]^+[F]^−$ that is formed as a byproduct.

While temperatures below −30° C. are adequate for the formation of $FSO_2NH_2$, lower temperatures may be used. Thus, in some embodiments the temperature of the solution is maintained at −40° C. or less, −50° C. or less, −60° C. or less, or −70° C. or less during the addition. The low temperature limit is defined by the liquidus point of the $SO_2F_2$/solvent mixture. In some embodiments, the temperature of the solution is maintained at −80° C. to −30° C., −80° C. to −40° C., or −80° C. to −50° C. during the addition.

At temperatures below −30° C., fewer than three molar equivalents of $NH_3$ can be used within the scope of the present invention, however, three molar equivalents of $NH_3$ are required to fully complete the reaction at reduced temperature. Thus, in some embodiments, the present invention is directed to adding a threefold molar excess of $NH_3$ to a vigorously stirred 1 molal solution of $SO_2F_2$ in tetrahydrofuran maintained at −70° C. (±5° C.) to produce $FSO_2NH_2$ as the product.

Lower temperatures result in a reduced pot pressure and the consumption of $SO_2F_2$ can be followed quantitatively by monitoring a drop in pressure as $NH_3$ is added to the reactor. Furthermore, below −58° C. $SO_2F_2$ is a liquid and at −70° C. the vapor pressure in a sealed, evacuated reactor charged with $SO_2F_2$, is less than 100 torr. Thus, at this temperature range the $SO_2F_2$ is almost completely dissolved, or at least in liquid form, and maximally available for reaction with $NH_3$. The reaction of dissolved $NH_3$ with $SO_2F_2$ in THF is very fast, indeed almost instantaneous, at these low temperatures. I have found that −70° C. to −73° C. can be a convenient range of starting temperatures: It is readily achievable using a dry ice-acetone slush bath, and provides reactor pressures in a range of 100 torr to 3 torr during the course of reaction.

At −70° C. and about 1 molal $SO_2F_2$ in tetrahydrofuran, this vapor pressure is roughly 75 torr, the exact figure dependent on the $SO_2F_2$ concentration. The use of vacuum conditions allows for the partial pressure of $NH_3$ to be estimated during the course of the reaction.

Observed $NH_3$ partial pressures during addition are a dependent function of other reaction parameters such as the type of solvent, $NH_3$ addition rate, cooling power, $SO_2F_2$ concentration, mixing speed, and the degree of completion of the reaction. In some embodiments, the $NH_3$ partial pressure can range from 0 to 150 torr, more preferably less than 50 torr, most preferably less than 20 torr. In tetrahydrofuran solvent at −70° C., $NH_3$ partial pressures of 2 torr to 20 torr are observed during the addition. However, under conditions of high $SO_2F_2$ concentration and toward the end of the $NH_3$ addition, $NH_3$ partial pressures of as much as 150 torr in THF have been observed without a corresponding rise in temperature. Other reaction conditions can require much higher $NH_3$ partial pressures. Endpoint pressures for 3:1 $NH_3/SO_2F_2$ are typically less than 5 torr at −72° C.

Although a reactor pressure greater than 760 torr can be employed within the scope of the present invention, reactor pressures at or below atmospheric are preferably maintained during the course of $NH_3$ addition and especially at the endpoint. In some embodiments, the endpoint pressure (i.e., the reactor pressure after $NH_3$ addition is complete) is within 1 to 2 torr of the solvent vapor pressure. Higher pressures at the endpoint can indicate a reactor leak or the presence of residual $SO_2F_2$.

In some embodiments, the reactor contents are allowed to warm to room temperature, or higher, under high $SO_2F_2$ partial pressure (up to 10 atmospheres). The following reactions ensue:

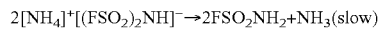

$2[NH_4]^+[(FSO_2)_2NH]^- \rightarrow 2FSO_2NH_2 + NH_3 \text{(slow)}$ and

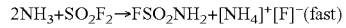

$2NH_3 + SO_2F_2 \rightarrow FSO_2NH_2 + [NH_4]^+[F]^- \text{(fast)}$

Under these conditions, the product $FSO_2NH_2$ can be recovered without acidification of the pot contents.

In an alternate embodiment, temperatures between −80° C. and −30° C. are employed at substantially constant reactor pressure (i.e., ±5% change in pressure), by introduction of $SO_2F_2$ using a gated valve to maintain the desired pressure over the course of the addition. This can reduce the cost of cooling the reactor.

Following the addition of $NH_3$, a sufficiently strong acid can be added to the resulting mixture to "quench" the reaction. In some embodiments, the same temperature that was maintained during the adding can be maintained during the quenching. However, temperatures above −30° C. can be maintained during the addition of a quench acid. For example, in some embodiments a temperature of 30° C. or less, or 0° C. or less can be maintained during the quenching.

In some embodiments, the solid, which comprises $[NH_4]^+$ $[F]^-$ and $[NH_4]^+[FSO_2NH]^-$, is acidified in situ with an acid (e.g., $H_2SO_4$), warmed, and filtered. Acids capable of forming a precipitate with the ammonium ion when added in a stoichiometric amount are preferred. For example, sulfuric acid works well when the reaction is run in tetrahydrofuran because ammonium sulfate and ammonium bisulfate are insoluble in this solvent.

After acidification and isolation, further purification of the resulting $FSO_2NH_2$ can be performed. In some embodiments, after acidification, the resulting $FSO_2NH_2$ is further optionally purified by distillation. Prior to distillation, volatile solvent can be removed, for example, by rotary evaporation and other means. Upon removal of the volatile solvent, the liquid residue is subjected to an extensive pump down before the product $FSO_2NH_2$ begins to distill. In some embodiments, the crude product contains HF, presumably bound in a 1:1 complex with $FSO_2NH_2$. For example, the presence of HF can be indicated by the slow corrosion of glassware, which indicates the presence of HF in the vapor efflux.

Yields of 60% or greater (based on the mole amount of $SO_2F_2$ starting material) have been achieved.

Compositions Comprising the Products

The present invention is further directed to compositions comprising the products. In some embodiments, a composition comprises a product of the present invention (i.e., $FSO_2NH_2$, $[FSO_2NH]^-$, and salts thereof) having a purity of 95% or greater, 98% or greater, 99% or greater, 99.5% or greater, 99.9% or greater, 99.99% or greater.

In an embodiment, the present invention is directed to the salt $[NH_4]^+[FSO_2NH]^-$.

In some embodiments, the present invention is directed to a composition comprising $FSO_2NH_2$, $[FSO_2NH]^-$, and salts thereof, in a purity of 95% or greater, 98% or greater, 99% or greater, 99.5% or greater, 99.9% or greater, 99.99% or greater. In some embodiments, the composition comprising $FSO_2NH_2$ and/or $[FSO_2NH]^-$ further comprises 5% or less, 2.5% or less, 1% or less, 0.5% or less, 0.1% or less, or 0.01% or less by weight of hydrofluoric acid, fluorosulfonic acid, or a combination thereof. In some embodiments, the composition comprising $FSO_2NH_2$ and/or $[FSO_2NH]^-$ is essentially free from hydrofluoric acid. In some embodiments, the composition comprising $FSO_2NH_2$ or $[FSO_2NH]^-$ is essentially free from fluorosulfonic acid.

EXAMPLES

Example 1

A 600 mL stainless steel pressure reactor (Parr Instrument Company) equipped with several inlets, an analog 100 psi pressure/vacuum gauge, a temperature probe, and a stir paddle, was charged with tetrahydrofuran (400 mL, distilled from $CaH_2$), and cooled with stirring to a temperature probe reading of −73° C. using a dry ice-methanol bath, and evacuated with a high vacuum pump starting at about −50° C. After ten minutes the internal pressure of the reactor had reached approximately −1 bar. The pump was disconnected and $SO_2F_2$ from a lecture bottle was introduced into the reactor over about six seconds to create an approximate 1 molal solution, the bottle of $SO_2F_2$ being weighed before and after to obtain an exact weight (37.7 g, 0.37 mol). When the reactor temperature had again reached −70° C., the internal vacuum had reached about −0.85 bar. The stir rate was checked to make sure it was maximized and three mole equivalents of $NH_3$ gas (18.8 g, 1.1 mol) were then metered at a constant rate into the evacuated volume at the top of the reactor over the course of fifty-three minutes. During this time the pressure and temperature within the vessel rose slightly and then dropped to −1 bar and −71° C. by the end of the addition. The reactor was stirred for six minutes at −72° C.

A chilled solution of $H_2SO_4$ (36.2 g, 0.37 mol) in tetrahydrofuran (55 mL) was then introduced into the reactor over 15 minutes at −72° C. to −66° C., followed by warming to +15° C. with a hot water bath over 13 minutes. The reactor was opened, the solids removed by filtration, and washed with tetrahydrofuran. The filtrate was concentrated on a rotary evaporator ("rotovapped") in a 45° C. water bath at 10 torr to constant volume. The liquor so obtained was diluted with ethyl ether (25 mL) giving a precipitate (sulfamide) which was filtered off. The filtrate was again rotovapped to constant volume and placed under high vacuum in a 70° C. oil bath.

After an hour, volatile solvent and HF were gone, and the product distilled off (52° C. to 46° C., 55 microns [remote gauge]); yield, 21.9 g (0.22 mol, 60%), as a dense colorless liquid.

Example 2

A reactor as described in Example 1 was charged with THF (400 mL), sealed, cooled to −30° C., and evacuated to a static pressure of 6 Torr. $SO_2F_2$ was added through a pressure-gated valve until the setpoint pressure of 700 Torr was achieved; approximately 50 grams $SO_2F_2$ was initially added. Ammonia (7.7 grams) was metered into the reactor at a constant rate over 110 minutes, maintaining a temperature range of −30 to −39° C. The absorption of ammonia was slow, compared to the reaction at −70° C.; low infusion rates of $NH_3$ were required to keep the gated valve in operation (cycling on and off). Toward the end of the addition, cycling ceased and a pressure of 200 Torr over the setpoint (i.e., 900 Torr) was observed. The addition was halted and the $SO_2F_2$ cylinder was weighed; 99.7 g was introduced. The reactor contents were stirred for two hours while warming to room temperature (22° C.) and held at room temperature for an hour, reaching an internal pressure of 64 psi (0.44 MPa; 4.4 atm). The reactor was then vented, opened, and the contents filtered. The filtrate was concentrated to 13 grams and diluted with ethyl ether (20 mL), giving a precipitate of sulfamide (4.95 grams). The supernatant was decanted, the solid washed with ether, and the liquids combined and concentrated to constant weight at room temperature under dynamic vacuum, yielding 2.93 grams of $FSO_2NH_2$—HF complex as a clear acidic oil.

These examples illustrate possible embodiments of the present invention. While various embodiments of the present invention have been described above, it should be understood that these are presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method comprising:
   adding $NH_3$ to a $SO_2F_2$ solution to form $FSO_2NH_2$ or a salt thereof comprising $[FSO_2NH]^-$ ion, wherein said solution is maintained at a temperature of −30° C. or less during the adding;
   adding an acid to the resulting mixture; and
   isolating the $FSO_2NH_2$ from the resulting mixture.

2. The method of claim 1, wherein the $SO_2F_2$ solution comprises $SO_2F_2$ in a concentration of 0.1 to 3 molal.

3. The method of claim 1, wherein the $NH_3$ is added to the $SO_2F_2$ solution in a molar ratio of 0.5:1 to 4:1 relative to the $SO_2F_2$.

4. The method of claim 1, wherein the $SO_2F_2$ solution comprises a solvent selected from the group consisting of tetrahydrofuran, ethyl acetate, ethyl ether, iso-propyl ether, 1,2-dimethoxyethane, acetonitrile, propionitrile, butyronitrile, dichloromethane, N,N-dimethylformamide, N,N-dimethylacetamide, N-methylpyrrollidinone, and a combination thereof.

5. The method of claim 1, wherein the $SO_2F_2$ solution is maintained at a temperature of −80° C. to 30° C. during the adding.

6. The method of claim 1, wherein the $SO_2F_2$ solution has an initial temperature of −30° C. or less and is maintained within ±5° C. of the initial temperature during the adding.

7. The method of claim 1, wherein the acid has a pKa less than that of $FSO_2NH_2$ and is added in an amount sufficient to provide a pH of 3 or less.

8. The method of claim 7, wherein the acid is selected from the group consisting of HCl, HF, HBr, acetic acid, $H_3PO_4$, $H_2SO_4$, $HSO_3CH_3$, $HSO_3CF_3$, $CF_3COOH$, and a combination thereof.

9. The method of claim 7, wherein the isolating comprises distilling the $FSO_2NH_2$.

10. The method of claim 1, wherein the salt is $[FSO_2NH]^{31}[NH_4]^{30}$, and precipitates as a solid from solution as a result of the adding.

11. The method of claim 10, comprising acidifying the solid to provide $FSO_2NH_2$, and distilling the $FSO_2NH_2$.

12. A method comprising:
   adding $NH_3$ to a $SO_2F_2$ solution to form $FSO_2NH_2$, wherein the $SO_2F_2$ solution contains an organic base with pKb greater than the pKb of $NH_3$, wherein said solution is agitated at a temperature of −30° C. or less during the adding;
   acidifying and filtering the resulting mixture; and
   distilling the $FSO_2NH_2$ from the resulting mixture.

13. The method of claim 12, wherein the $NH_3$ is added to the $SO_2F_2$ solution in a molar ratio of 0.5:1 to 4:1 relative to the $SO_2F_2$.

14. The method of claim 12, wherein the $SO_2F_2$ solution is maintained at a temperature of −80° C. to −30 ° C. during the adding.

15. The method of claim 12, where the step of acidifying and filtering the resulting mixture comprises adding an acid in situ in the resulting mixture.

* * * * *

UNITED STATES PATENT AND TRADEMARK OFFICE
CERTIFICATE OF CORRECTION

PATENT NO. : 8,828,346 B2  Page 1 of 1
APPLICATION NO. : 13/415461
DATED : September 9, 2014
INVENTOR(S) : Martin R. Johnson It is certified that error appears in the above-identified patent and that said Letters Patent is hereby corrected as shown below:

In the Claims:

Claim 10, Column 8, Line 36 – delete "[FSO2NH]31[NH4]30" and insert -- $[FSO_2NH][NH_4]^+$ --.

Signed and Sealed this
Ninth Day of February, 2016

Michelle K. Lee
*Director of the United States Patent and Trademark Office*